(12) United States Patent
Gan

(10) Patent No.: US 8,438,308 B2
(45) Date of Patent: *May 7, 2013

(54) METHOD AND APPARATUS FOR COMPUTING A BACKUP PATH USING FATE-SHARING INFORMATION

(75) Inventor: Der-Hwa Gan, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/337,773

(22) Filed: Dec. 27, 2011

(65) Prior Publication Data

US 2012/0096182 A1 Apr. 19, 2012

Related U.S. Application Data

(63) Continuation of application No. 09/795,454, filed on Mar. 1, 2001, now Pat. No. 8,103,789.

(51) Int. Cl.
*G06F 15/173* (2006.01)

(52) U.S. Cl.
USPC ........... 709/239; 709/224; 709/238; 370/242; 714/2

(58) Field of Classification Search .......... 709/238–239; 370/238.1, 242, 351; 714/2
See application file for complete search history.

(56) References Cited

U.S. PATENT DOCUMENTS

| | | | |
|---|---|---|---|
| 5,317,566 A | 5/1994 | Joshi | |
| 5,754,543 A | 5/1998 | Seid | |
| 5,850,505 A | 12/1998 | Grover et al. | |
| 5,872,773 A | 2/1999 | Katzela et al. | |
| 5,933,425 A | 8/1999 | Iwata | |
| 6,084,858 A | 7/2000 | Matthews et al. | |
| 6,094,687 A | 7/2000 | Drake et al. | |
| 6,098,107 A | 8/2000 | Narvaez-Guarnieri et al. | |
| 6,141,318 A | 10/2000 | Miyao | |
| 6,141,319 A | 10/2000 | Dighe et al. | |
| 6,192,043 B1 | 2/2001 | Rochberger | |
| 6,256,295 B1 * | 7/2001 | Callon | 370/254 |
| 6,256,309 B1 | 7/2001 | Daley et al. | |
| 6,498,778 B1 | 12/2002 | Cwilich et al. | |
| 6,507,561 B1 | 1/2003 | Baniewicz et al. | |
| 6,542,934 B1 | 4/2003 | Bader et al. | |
| 6,584,075 B1 | 6/2003 | Gupta et al. | |
| 6,633,544 B1 * | 10/2003 | Rexford et al. | 370/238 |

(Continued)

OTHER PUBLICATIONS

Co-pending U.S. Appl. No. 09/795,454, filed Mar. 1, 2001 entitled "Method and Apparatus for Computing a Backup Path Using Fate-Sharing Information" by GAN, 24 pages.

*Primary Examiner* — Abdullahi Salad
(74) *Attorney, Agent, or Firm* — Harrity & Harrity, LLP

(57) ABSTRACT

To address shortcomings in the prior art, the invention uses fate sharing information to compute backup paths. Fate sharing information relates groups of nodes or links according to common characteristics, attributes, or shared resources (e.g., a shared power supply, close proximity, same physical link). In one embodiment, fate-sharing information includes costs associated with groups of nodes or links. When a primary path contains a link or node that is in a fate-sharing group, the other links or nodes in the fate-sharing group are assigned the cost associated with that fate-sharing group. The node computing the backup path takes into account the assigned cost together with other node and link costs. Discovering the existence of the relationships and assigning costs to the groups may be done manually or automatically.

18 Claims, 8 Drawing Sheets

U.S. PATENT DOCUMENTS 6,697,333 B1    2/2004  Bawa et al.
6,754,835 B2 *  6/2004  Bandholz et al. ............. 713/300
7,093,288 B1 *  8/2006  Hydrie et al. ................... 726/13

* cited by examiner

| Link/node group | Cost |
|---|---|
| Nodes B, D | 500 |
| Link A-B, A-E | 400 |
| Link D-C, E-C | 600 |
| ... | ... |

Fig. 3

METHOD AND APPARATUS FOR COMPUTING A BACKUP PATH USING FATE-SHARING INFORMATION

RELATED APPLICATION

This application is a continuation of U.S. patent application Ser. No. 09/795,454, filed Mar. 1, 2001, the entire disclosure of which is incorporated herein by reference.

BACKGROUND OF THE INVENTION

In today's computer networks, clients and servers are connected through a mesh of interconnected nodes. These nodes may include routers or switches, which forward data packets to neighboring nodes until the data packets reach their destinations.

Nodes may use different techniques for determining the neighboring nodes to which data is forwarded. One technique involves a node computing a complete or partial path through the network. The node may compute the path using an algorithm, such as Shortest Path First, and/or using external information, such as traffic engineering information or user configured information. Such a computation usually involves assigning costs to links and nodes in the network and computing the least cost path through the network.

In some cases, a node may compute more than one path. In such a case, one path is used as the primary path and the other(s) as backup(s). If, for whatever reason, the primary path becomes unusable (e.g., a link or node in the primary path malfunctions or becomes incapacitated), the node switches over to one of the backup paths. Having a precomputed backup path reduces the time needed to establish a new path.

The backup path(s) is useless, however, if it goes down at the same time and for the same reason as the primary path. This may happen when the primary and backup paths contain links or nodes that share common characteristics, attributes, or resources. For example, the primary path and backup path may contain lines that share the same trench. A cut in the primary path line is likely to cut the backup path line. Or, the primary path and backup path contain nodes that share the same power supply. If the power supply fails, neither path is usable.

SUMMARY OF THE INVENTION

The invention addresses these shortcomings and other shortcomings in the prior art. The scope of the invention is defined by the appended claims.

In one aspect of the invention, fate-sharing information is stored in memory. This may be done, for example, by determining a relationship between a group of links or nodes in a network, assigning a cost corresponding to the link or node group based on the relationship, and storing the cost and associated link or node group in memory.

In another aspect of the invention, fate-sharing information is used to compute a backup path. This may be done, for example, by accessing cost information associated with a link or node group when a link or node from that group is used in the primary path, assigning the accessed cost to the links or nodes in the group that are not in the primary path, and computing a least cost path based, at least in part, on the assigned cost information.

BRIEF DESCRIPTION OF THE DRAWINGS

FIG. 3 shows an example of how information may be stored in the fate-sharing database;

DETAILED DESCRIPTION

To address shortcomings in the prior art, the invention uses fate sharing information to compute backup paths. Fate sharing information relates groups of nodes or links according to common characteristics, attributes, or shared resources (e.g., a shared power supply, close proximity, same physical link). In one embodiment, fate-sharing information includes costs associated with groups of nodes or links. When a primary path contains a link or node that is in a fate-sharing group, the other links or nodes in the fate-sharing group are assigned the cost associated with that fate-sharing group. The node computing the backup path takes into account the assigned cost together with other node and link costs. Discovering the existence of the relationships and assigning costs to the groups may be done manually or automatically.

The following description of the invention refers to the accompanying drawings. The same reference numbers and different drawings identify the same or similar elements. Also, the following detailed description does not limit the invention. Instead, the scope of the invention is defined by the appended claims and equivalents.

Figure 1:
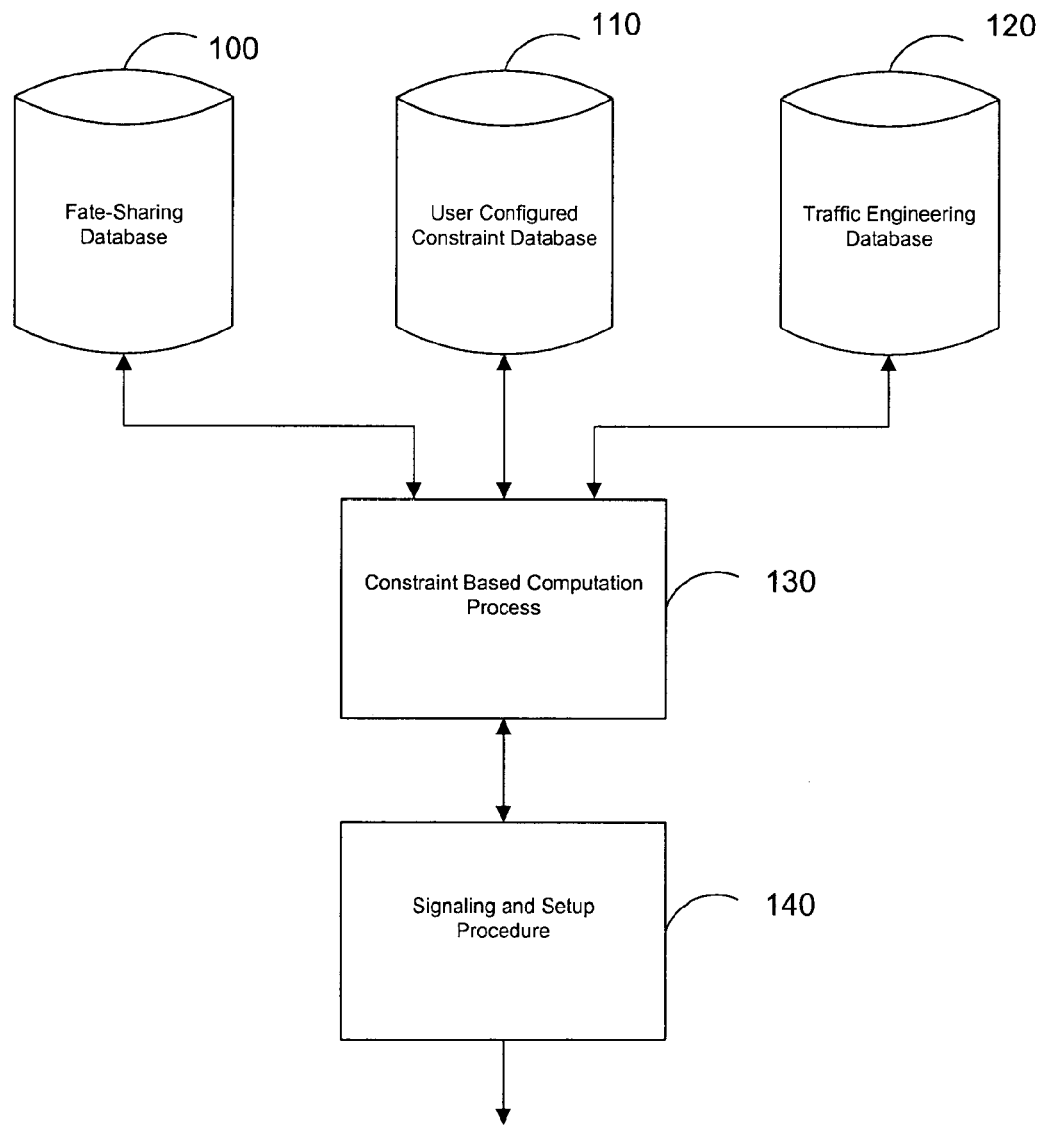
FIG. 1 shows a block diagram of a system including a fate-sharing database, according to one embodiment of the invention.

FIG. 1 shows a block diagram of a system including a fate-sharing database, according to one embodiment of the invention. The system shown in FIG. 1 includes fate-sharing database 100, user configured constraint database 110, traffic engineering database 120, constraint based computation process 130, and signaling and setup process 140. This system may be used as part of a network node (such as a router or switch) or as a separate stand-alone system. For example, the system may be incorporated into node A of the network shown in FIG. 2A, discussed in greater detail below.

Databases 100, 110, and 120 preferably store, on a computer-readable media, constraint and/or cost information associated with links and nodes in a network. While FIG. 1 shows these databases as separate databases, they may be combined or maintained separately. Additionally, in other embodiments (not shown), fewer or more databases containing constraint and/or cost information may be used.

Database 100 stores fate-sharing information. As mentioned above, fate-sharing information relates groups of nodes or links according to common characteristics, attributes, or shared resources.

An example of how information may be stored in fate sharing database 100 is shown in FIG. 3. FIG. 3 shows a database record containing three entries corresponding to links and nodes in the network shown in FIG. 2A. The first entry indicates that the group of nodes B and D are associated with a cost 500. The second entry indicates that the group of links A-B and A-E are associated with a cost 400. The third entry indicates that the group of links D-C and E-C are associated with a cost 600. Each entry indicates that the nodes or links in each group are related. Of course, more or fewer entries can be included in database 100. Further, in alternative embodiments, different fields may be stored in database 100 to reflect the relationships between groups of links and nodes.

Figure 4:
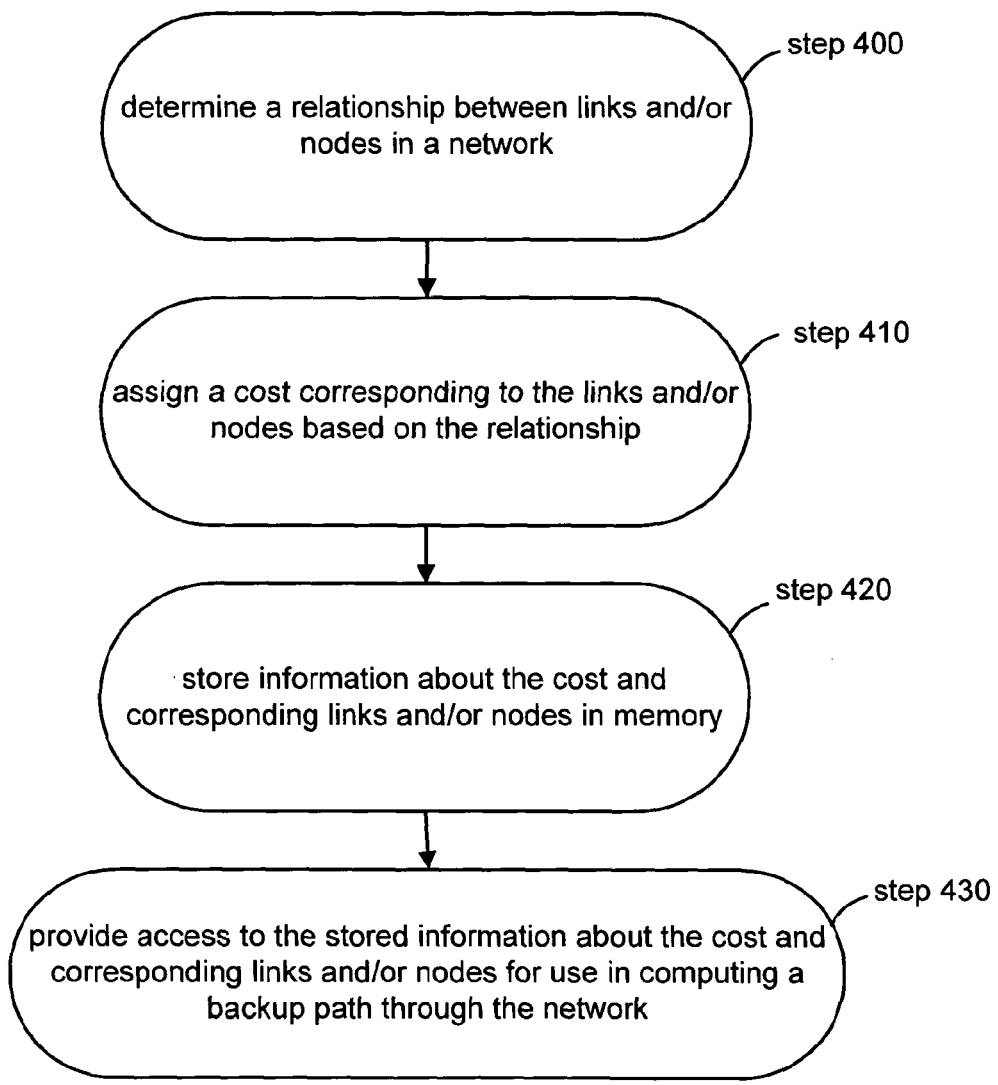
FIG. 4 shows a flow diagram of a method for establishing a fate-sharing database.

A flowchart showing a process, by which the fate-sharing database is established, according to one embodiment of the invention, is shown in FIG. 4. A relationship is determined between a group of links and/or nodes in a network (step 400). Examples of relationships are nodes or links that share a power supply, are in close proximity, or share the same physical link or node. In a preferred embodiment, the relationship is such that the group of nodes or links may become inoperable when a single event occurs. Determining the existence of the relationships may be done manually or automatically by devices in the network.

A cost corresponding to the link and/or node groups is assigned (step 410). In one embodiment, the cost values may be assigned according to the likelihood that failure to one node or link will result in failure to the other(s) in the group. For example, the higher the likelihood that failure to one node will result in failure to the other nodes in the group, the higher the assigned cost value.

Information about the cost and corresponding link and/or node groups is stored in memory (step 420). Access is provided to the stored information for use in computing a backup path through the network (step 430).

Returning back to the block diagram of the system shown in FIG. 1, user configured constraint database 110 preferably contains constraints relating to the routing or forwarding of data in a network. Such constraints may take the form of bandwidth requirements, hop-count limitations, priorities, etc. determined costs set by the network administrator indicating how network resources may be used.

Traffic engineering database 120 preferably contains a topology map of all nodes/links in the network, as well as costs for using nodes and links in the network. These costs may be set in a manner that determines how traffic flows through the network (e.g., which paths are used).

Constraint based computation process 130 can access constraint and cost information from fate sharing database 100, user configured constraint database 110, and traffic engineering database 120. Constraint based computation process 130 preferably computes paths based on this constraint and cost information according to a constraint shortest path first algorithm. In other embodiments, other algorithms may be also be used.

Signaling and setup process 140 receives path information from constraint based computation process 130 and establishes primary and backup paths. In one embodiment, the primary path is the least cost path and the backup paths are determined as the next least cost paths. Process 140 selects either the primary or, if unavailable, the next computed backup path. When the primary path becomes unusable or inoperable, signaling and setup process 140 switches over to the backup path. Process 140 outputs the selected path, preferably for use in forwarding data (e.g., packets) along the selected path. In one embodiment, process 140 outputs the selected path to other processes and/or modules responsible for controlling the forwarding of data packets along the selected path.

In one embodiment, process 130 and process 140 comprise software instructions executed on one or more processors. In alternative embodiments, process 130 and process 140 may be functions implemented in hardware, such as circuits or ASICs, or a combination of hardware and software. Further, while process 130 and process 140 are shown as separate processes, some or all of their functionality may be combined into a single process.

FIGS. 2A-2D illustrate a simple network in which the invention may be used. The network comprises five nodes (A, B, C, D, E) and six links (A-B, A-D, A-E, D-C, B-C, E-C). The nodes may be routers or switches or other networking devices that compute paths through a network. While the invention is described in connection with a simple network, the principles of the invention apply to more complex networks containing more nodes and/or links as well as simpler networks containing fewer nodes and/or links.

Figure 2A:
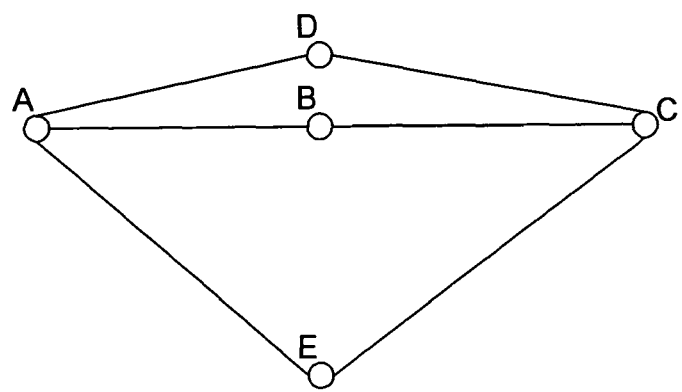
FIGS. 2A-2D illustrate a simple network in which the invention may be used.
Figure 2B:
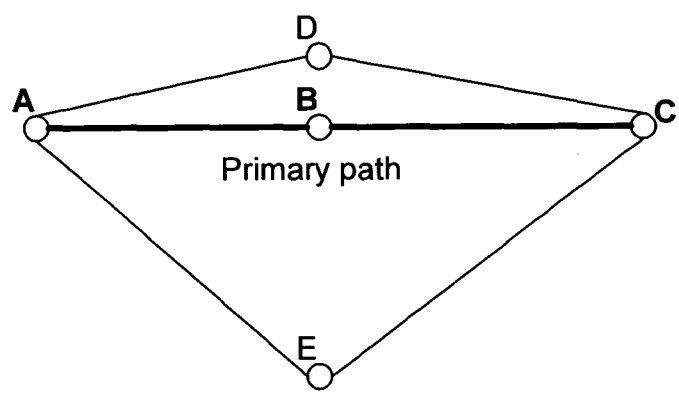
Figure 2C:
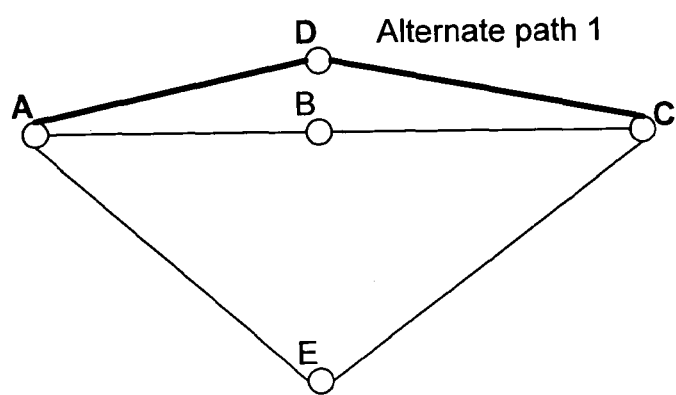
Figure 2D:
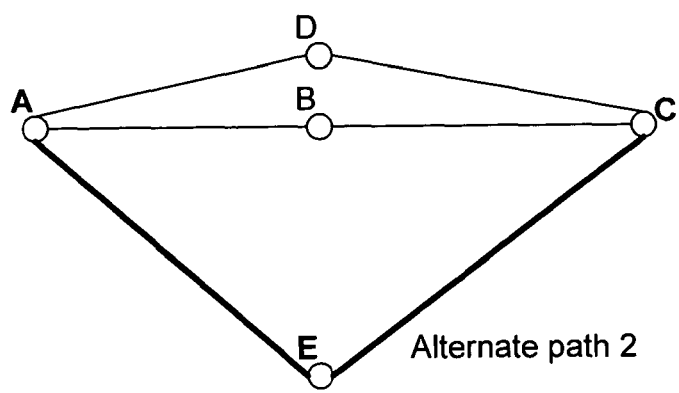

In the network shown in FIG. 2A, node A computes a path to node C. For example, node A may determine that path A-B-C is the least cost path and designate that path to be the primary path, as shown in FIG. 2B. Node A may then compute the costs of alternate paths and select the next least cost path to be the backup path to node C. One alternative path is path A-D-C (as shown in FIG. 2C) and another alternative path is path A-E-C (as shown in FIG. 2D).

Figure 5:
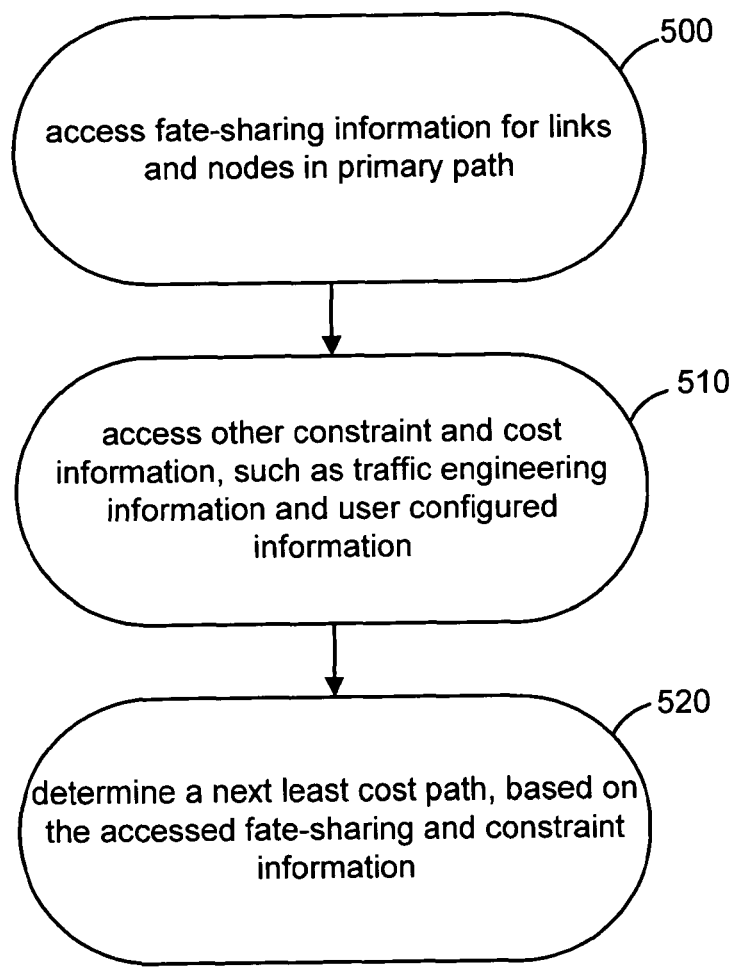
FIG. 5 shows a flow diagram of a method using the fate-sharing database.

The process for computing the backup path using fate sharing information is shown in connection with FIG. 5. These steps are illustrated by example with reference to the network shown in FIGS. 2C-2D.

The computing node accesses fate sharing information for links and nodes in groups associated with links and nodes in the primary path (step 500 shown in FIG. 5). Referring to FIGS. 2C-2D, node A takes into account fate sharing information relevant to primary path A-B-C and the alternate paths in determining which alternative path is the appropriate backup path. For example, applying the fate sharing information shown in FIG. 3, a cost of 500 corresponding to the first entry is assigned to node D since node B of the first group is in the primary path; and a cost of 400 corresponding to the second entry is assigned to link A-E since link A-B of the second group is also in the primary path. The cost in the third entry, however, is not used since neither link in the third group is used in the primary path.

The computing node accesses other constraint and cost information (step 510). This information may include traffic engineering information and user configured information. The computing node determines a next least cost path based on the accessed information (step 520). In the case of the alternate paths shown in FIGS. 2C-2D, node A determines which of these alternate paths is the next least cost path by adding the assigned fate-sharing costs to the other costs for each alternate path.

As shown by the example discussed in connection with FIGS. 2A-2D and 3, the backup path that is ultimately selected may still contain links or nodes that are related to link or nodes in the primary path. This may occur, for example, when all of the alternate paths contain links or nodes associated with fate sharing information. By taking fate-sharing information into consideration, however, the chances that both the primary path and backup path will be taken down by the same event is reduced.

The foregoing description of preferred embodiments of the present invention provide illustration and description, but is not intended to be exhausted or to limit the invention to the precise form disclosed. Modifications and variations are possible in light of the above teachings or may be acquired from practice of the invention.

The scope of the invention is defined by the claims and their equivalents.

What is claimed is:

1. A non-transitory memory device storing instructions, the instructions comprising:
   one or more instructions which, when executed by one or more processors, cause the one or more processors to:
      determine that an occurrence of a particular event may cause a failure of at least two links or at least two nodes;
      determine a relationship between the at least two links or the at least two nodes based on determining that the occurrence of the particular event will cause the failure of the at least two links or the at least two nodes;
determine a first value associated with the at least two links or the at least two nodes, the first value indicating a likelihood that a failure of a first link of the at least two links, or a failure of a first node of the at least two nodes, resulting from the occurrence of the particular event, will result in a failure of other links of the at least two links or other nodes of the at least two nodes;
assign, based on the relationship, the first value to:
each link of the at least two links, or
each node of the at least two nodes;
determine a first cost for each link, of the at least two links, or each node, of the at least nodes, based on the first value,
the first cost being associated with transmitting data via the link or the node; and
determine, based on the first cost, a primary path and a secondary path through a network.

2. The non-transitory memory device of claim 1, where the one or more instructions to determine the first value include:
one or more instructions to determine a probability that the failure of the first link or the first node, caused by the occurrence of the particular event, will cause the failure of the other links or the other nodes.

3. The non-transitory memory device of claim 2, where the particular event includes a failure of a resource that supplies power to devices associated with the at least two links or the at least two nodes.

4. The non-transitory memory device of claim 1, where the one or more instructions to determine the relationship include at least one of:
one or more instructions to identify a physical link that is common to the at least two links, or
one or more instructions to identify a physical node that is common to the at least two nodes.

5. The non-transitory memory device of claim 1, where the one or more instructions to determine the primary path and the secondary path include:
one or more instructions to determine a least cost path based on the first cost, and
one or more instructions to determine the primary path based on the determined least cost path.

6. The non-transitory memory device of claim 1, where the instructions further comprise:
one or more instructions to determine that the primary path is unavailable; and
one or more instructions to determine, based on the first cost, another path based on determining that the primary path is unavailable,
where the other path is different from the primary path and the secondary path.

7. A network device comprising:
one or more processors to:
determine that an occurrence of a single event may cause a failure of a group of network components, of a plurality of network components included in a network,
the single event being related to a resource of the network, and
the group of network components including more than one network component,
determine a relationship between the group of network components based on determining that the occurrence of the particular event may cause the failure of the group of network components,
determine, for a first network component, of the group of network components, a value based on a likelihood that a failure of the first network component, that is caused by the occurrence of the single event, will cause a failure of other network components, of the group of network components,
associate information identifying the value with each network component of the group of network components,
determine a first path through the network, via two or more of the group of network components, and
determine a second path through the network based on the information.

8. The network device of claim 7, where the one or more processors are further to:
assign a cost to, each network component, of the plurality of network components, based on the information and information related to transmitting data via through the network via the network component,
where the first path is determined based on the assigned costs.

9. The network device of claim 8, where, when determining the value, the one or more processors are further to:
determine a probability that the failure of the first network component, that is caused by the occurrence of the single event, will cause the failure of the one or more other network components, of the group of network components.

10. The network device of claim 8, where, when associating the information with each network component of the group of network components, the one or more processors are to:
determine, for the first network component that a first probability that the failure of the first network component, that is caused by a failure of the resource, will result in the failure of the other network components is greater than a second probability that a failure of a second network component, of the group of network components, that is caused the by failure of the resource, will result in the failure of the other network components,
assign, based on determining that the first probability is greater than the second probability, a first cost to the first network component and a second cost to the second network component, the first cost being greater than the second cost, and
determine the value based the first cost.

11. The network device of claim 7, where the resource comprises a power supply that supplies power to the group of network components.

12. The network device of claim 7, where the one or more processors, when determining that the occurrence of the single event may cause the failure of the group of network components, are further to:
identify a physical link or a physical node that is common to the group of network components, and
determine, based on identifying the physical link or the physical node, that a failure of the physical link or a failure of the physical node may cause the failure of the group of network components.

13. A method comprising:
determining, by a network device, that an occurrence of an event may cause a failure of a group of network components, of a plurality of network components included in a network,
the group of network components comprising more than one network component, of the plurality of network components, and the event being related to a common characteristic or a common attribute, of the group of network components, that is related to a shared network resource;

determining, by the network device, a relationship between the group of network components based on determining that the occurrence of the event may cause the failure of the group of network components;

determining, by the network device, a first value associated with a first network component, of the group of network components,
the first value indicating a likelihood that a failure of the first network component, resulting from the occurrence of the event, will result in a failure of one or more other network components of the group of network components;

assigning, by the network device, a first cost to each network component, of the group of network components, based on the relationship and the first value; and determining, by the network device, a primary path and a secondary path through the network based on the first cost.

14. The method of claim 13,
where the secondary path is different from the primary path.

15. The method of claim 13, where determining the first value includes:
determining a probability that the failure of the first network component, caused by a failure of the shared resource, will result in the failure of the one or more other network components of the group of network components.

16. The method of claim 13, further comprising:
determining that the shared resource supplies power to the group of network components, and
where determining that the occurrence of the event may cause the failure of the group of network components includes:
determining that the occurrence of the event may cause the failure of the group of network components based on determining that the shared resource supplies the power to the at least two network components.

17. The method of claim 13, where determining that the occurrence of the event may cause the failure of the group of network components includes at least one of:
identifying a physical link that is common to the group of network components, or
identifying a physical node that is common to the group of network components.

18. The method of claim 13, where determining the primary path includes:
determining a least cost path through the network based on the first cost, and
determining the primary path based on the determined least cost path through the network.

* * * * *